US009948605B2

(12) United States Patent
Chen et al.

(10) Patent No.: US 9,948,605 B2
(45) Date of Patent: Apr. 17, 2018

(54) NETWORK TRAFFIC CLASSIFICATION

(71) Applicant: Comcast Cable Communications, LLC, Philadelphia, PA (US)

(72) Inventors: Michael Chen, Wallingford, PA (US); Sree Kotay, Philadelphia, PA (US); John Robinson, South Riding, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 190 days.

(21) Appl. No.: 14/335,479

(22) Filed: Jul. 18, 2014

(65) Prior Publication Data
US 2016/0021058 A1    Jan. 21, 2016

(51) Int. Cl.
*H04L 29/06* (2006.01)

(52) U.S. Cl.
CPC ...... *H04L 63/0254* (2013.01); *H04L 63/1466* (2013.01); *H04L 69/162* (2013.01)

(58) Field of Classification Search
CPC ............. H04L 63/0254; H04L 63/1441; H04L 61/6063; H04L 67/14
USPC ......................................................... 726/13
See application file for complete search history.

(56) References Cited

U.S. PATENT DOCUMENTS

| | | | | |
|---|---|---|---|---|
| 8,595,478 B2* | 11/2013 | Haney | ................ | H04L 12/4633 709/226 |
| 2001/0056492 A1* | 12/2001 | Bressoud | ................ | H04L 29/06 709/227 |
| 2002/0031089 A1* | 3/2002 | Elloumi | ................ | H04L 47/10 370/235 |
| 2002/0145981 A1* | 10/2002 | Klinker | ............... | H04L 12/5695 370/244 |
| 2003/0053448 A1* | 3/2003 | Craig | .................. | H04L 67/2814 370/353 |
| 2003/0231640 A1* | 12/2003 | Basso | ..................... | H04L 47/10 370/401 |
| 2004/0022191 A1* | 2/2004 | Bernet | ................ | H04L 12/5695 370/230 |
| 2005/0030952 A1* | 2/2005 | Elmasry | .............. | H04L 12/5695 370/395.2 |
| 2005/0152369 A1* | 7/2005 | Ambe | ..................... | H04L 12/44 370/392 |
| 2010/0150107 A1* | 6/2010 | Aghvami | .......... | H04W 36/0016 370/331 |

OTHER PUBLICATIONS

Babiarz et al., RFC 4594, Aug. 2006*
Babiarz et al., RFC 4594, Aug. 2006.*
Nichols et al., RFC 2474, Dec. 1998.*
Blake et al, RFC 2475, Dec. 1998.*

* cited by examiner

*Primary Examiner* — William Goodchild
(74) *Attorney, Agent, or Firm* — Banner & Witcoff, Ltd.

(57) ABSTRACT

Some aspects as described herein are directed to mirroring, in upstream and/or downstream data traffic for a particular connection, markings of data packets (e.g., DSCP and/or other markings) that have been received in downstream data traffic for that same connection. A trusted device in the network may control the markings, rather than a less-trusted endpoint device and/or a less trusted software application operating in any device.

20 Claims, 12 Drawing Sheets

NETWORK TRAFFIC CLASSIFICATION

BACKGROUND

Service providers are more recently finding themselves in a position in which a common delivery infrastructure is used to provide multiple services to customers. For example, in the past, an Internet service provider may have used one delivery infrastructure for providing Internet service to a customer, while a separate video (e.g., cable or satellite) service provider or a telephone service provider may have used one or more other delivery infrastructures to provide video and/or telephony services to that customer. Now, as services have begun converging, it has become more common for a single service provider to provide multiple services using the same technology. For example, a service provider may provide network access (e.g., Internet) services, video services and telephony services using the same or overlapping delivery infrastructure (e.g., via an Internet Protocol-based network or a DOCSIS delivery platform), commonly referred to as triple-play service.

At the same time, many service providers may implement, or at least consider, monitoring data usage of their users in order to provide better customer experience while simultaneously managing the costs associated with network expansion. For instance, service providers may offer some service plans that allow for more data usage than others. To implement such plans, service providers may monitor the amount of data being sent and/or received by users.

SUMMARY

The following summary is for illustrative purposes only, and is not intended to limit or constrain the detailed description.

As discussed above, service providers have shown increasing interest in monitoring data usage. Some service providers may desire to monitor some types, and not other types, of data usage. For instance, a service provider may wish to monitor data usage for regular Internet web browsing traffic to/from one or more external network locations (e.g., one or more Internet servers) but not data usage for streaming video content by the service provider itself, such as Title VI service video content or other designated data traffic. In this situation, the service provider may also not wish to monitor data associated with presenting information about the video content and/or selecting the video content for viewing.

This may be challenging especially where the user end device being used for video selection and viewing and for Internet browsing, is a trusted device of the service provider such as a set top box or other trusted device. Many service provider's trusted devices are treated as being always using Title VI service. In such a case, certain network (e.g., Internet) traffic typically traverses a web proxy server. This may be problematic for certain applications (such as Internet applications) that need modification to use a web proxy server, and may be a larger barrier for other applications that use traffic types that a typical web proxy server cannot handle (e.g., Skype). Also, Internet traffic is generally not classified appropriately since the Internet nature of the traffic is masked by the Title VI proxy.

Accordingly, some aspects as described herein are directed to mirroring, in upstream and/or downstream data traffic, markings of packets that have been received in downstream data traffic. A trusted device in the network may control the markings, rather than a less-trusted endpoint device and/or a less trusted software application operating in any device. This may help prevent a rogue device and/or software application from asserting incorrect markings in an attempt to gain incorrect classification of data. Some embodiments described herein employ differentiated service code point (DSCP) markings, for example, and other types of packet markings may be used.

According to further aspects as described herein, a method, system, software, and/or apparatus may be provided for receiving a first data packet having a first DSCP marking, and associating the first DSCP marking with a first connection that is associated with the first data packet. Responsive to determining that a connection associated with a second data packet is the first connection, the second data packet may be marked with the first DSCP marking. Moreover, the second data packet, so marked, may be sent.

According to still further aspects as described herein, a method, system, software, and/or apparatus may be provided for determining, based on a connection associated with a first data packet and a predetermined association between one or more DSCP markings and one or more connections, a first DSCP marking for the first data packet. The first data packet may be marked with the first DSCP marking, and the first data packet, so marked, may be sent.

According to still further aspects as described herein, a method, system, software, and/or apparatus may be provided for determining, based on a destination of the data packet, whether to mark a data packet to have a first DSCP marking. Responsive to determining to mark the data packet, the first data packet may be marked to have the first DSCP marking. The first data packet, so marked, may be sent.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
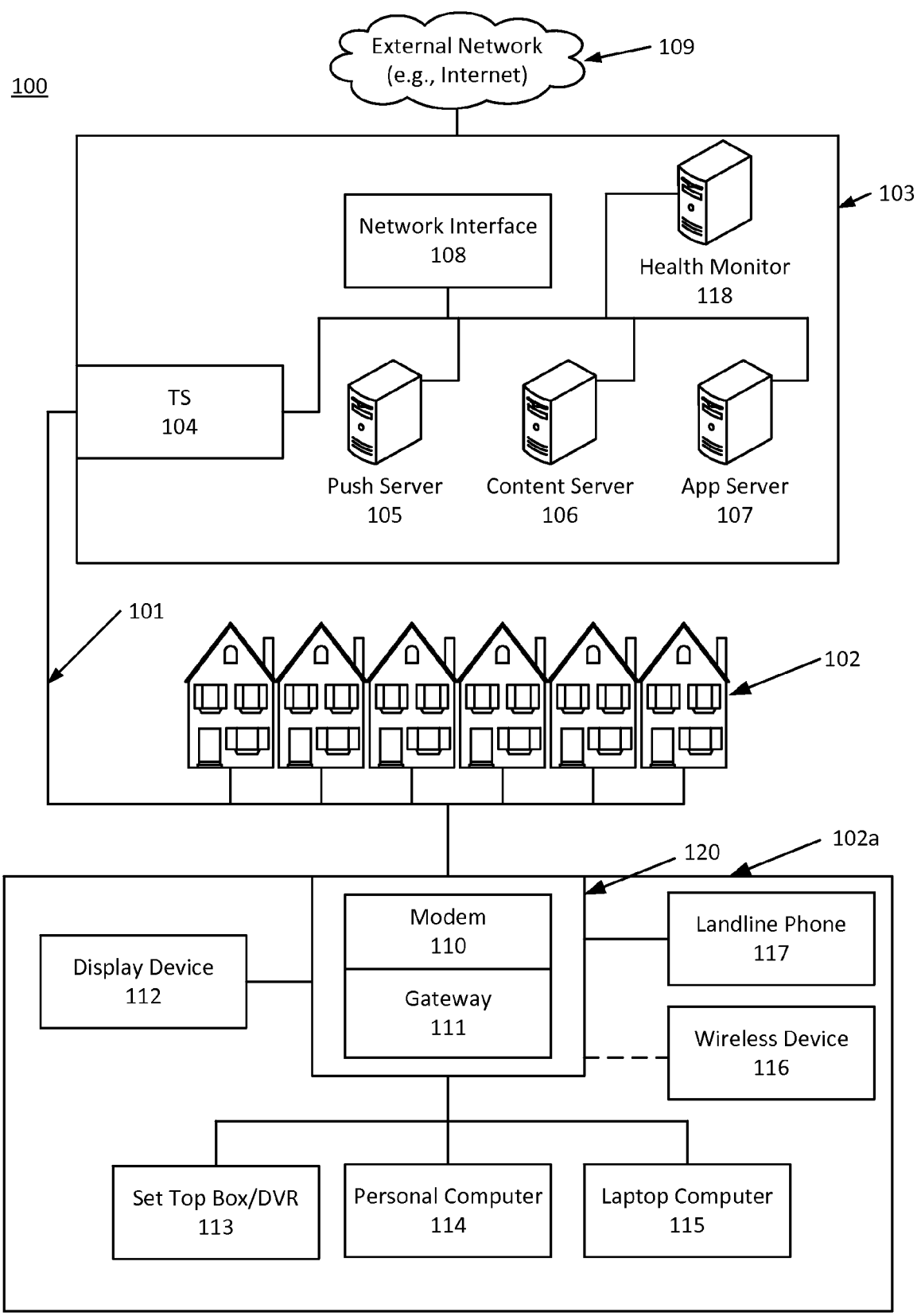
FIG. 1 illustrates an example system and network in which various features described herein may be implemented.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
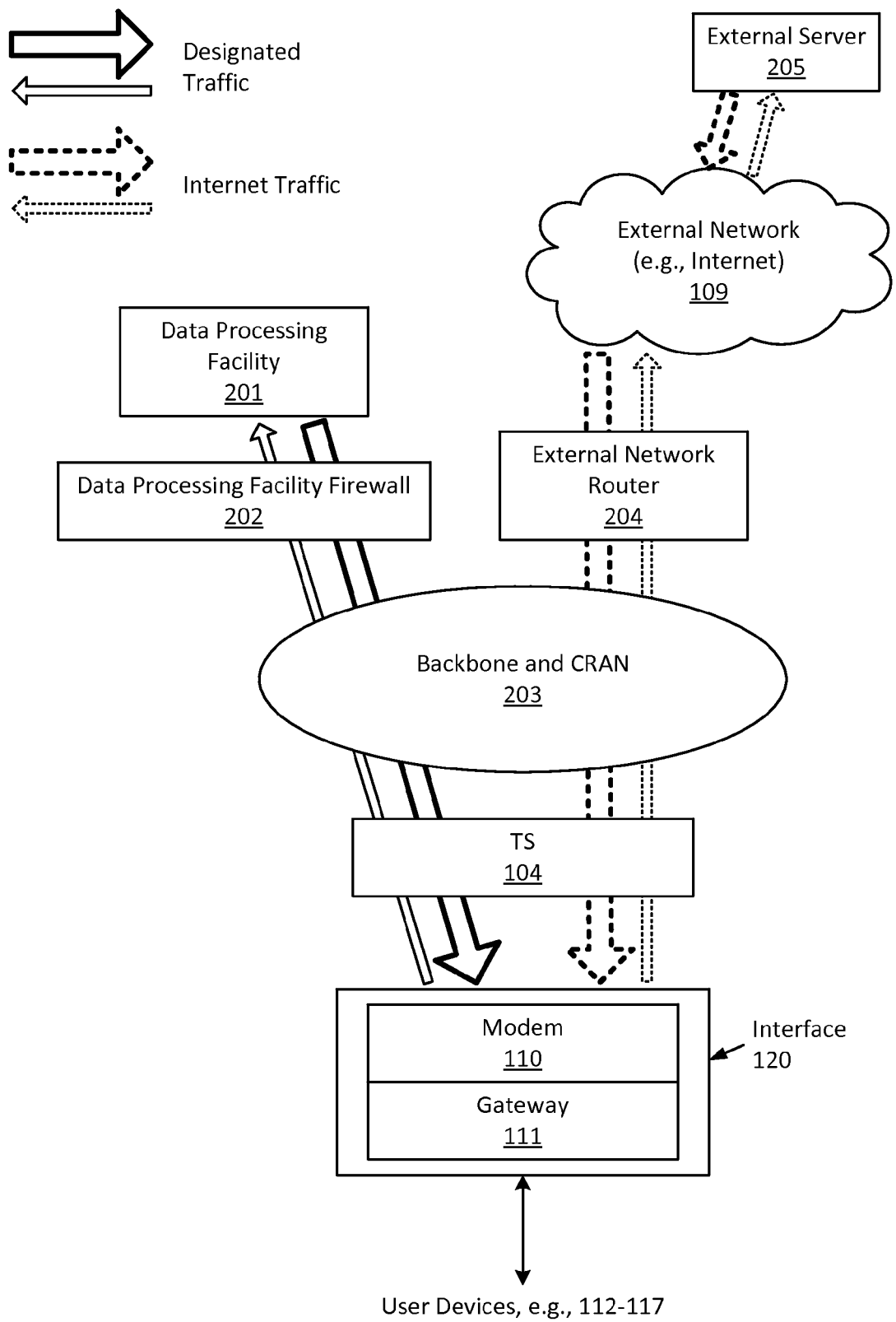
FIG. 2 illustrates another example system and network in which various features described herein may be implemented.

FIG. 2 illustrates another example communication network on which many of the various features described herein may be implemented. The communication network of FIG. 2 may be part of, overlap with, be coupled to, include, and/or be separate from the communication networks of FIG. 1. For example, FIG. 2 shows interface 120 being coupled to TS 104, which may be via communication lines 101 as described above with regard to FIG. 1. In this example, the communication network may also include a distribution network that may include, for instance, a backbone infrastructure and/or a converged regional area network (CRAN) 203 for distributing communications and/or other signaling amongst various portions of the communications network. The backbone and/or CRAN 203 may, for instance, couple TS 104 (and/or multiple other TSs) with a data processing facility firewall 202 (and/or multiple other data processing facility firewalls) and an external network router 204 (and/or multiple other external network routers). The firewall 202, in turn, may be coupled to a data processing facility 201, such as a data center, and the external network router 204 may be coupled to the external network 109, such as the Internet. One or more external servers 205, such as Internet web servers, databases, and the like, may be also coupled to the external network 109.

While the data processing facility 201, the firewall 202, the external network router 204, and the backbone and/or CRAN 203 are not explicitly shown in the example of FIG. 1, one or more of these elements may be part of and/or coupled to the local office 103 or disposed elsewhere. The data processing facility 201 may be responsible for providing content for various designated services such as Title VI video services (e.g., services provided by the data processing facility 201 and/or by other systems under control of the service provider). For instance, where a user of one of the devices 112-117 wishes to view a movie, television, or other content managed, sourced, and/or generated by the user's service provider (for instance, Title VI content, non-Internet content, etc.), such content may be provided via the data processing facility 201. In contrast, where the user wishes to browse the Internet and/or otherwise send and/or receive data to/from the Internet, the data processing facility 201 may not necessarily be involved, and instead content provided to the user may be sourced from, e.g., external server 205 via the external network 109 (e.g., the Internet). FIG. 2 illustrates this distinction by using solid arrows to designate traffic comprising Title VI traffic, and broken arrows to designate Internet (or other external network) traffic.

Figure 3:
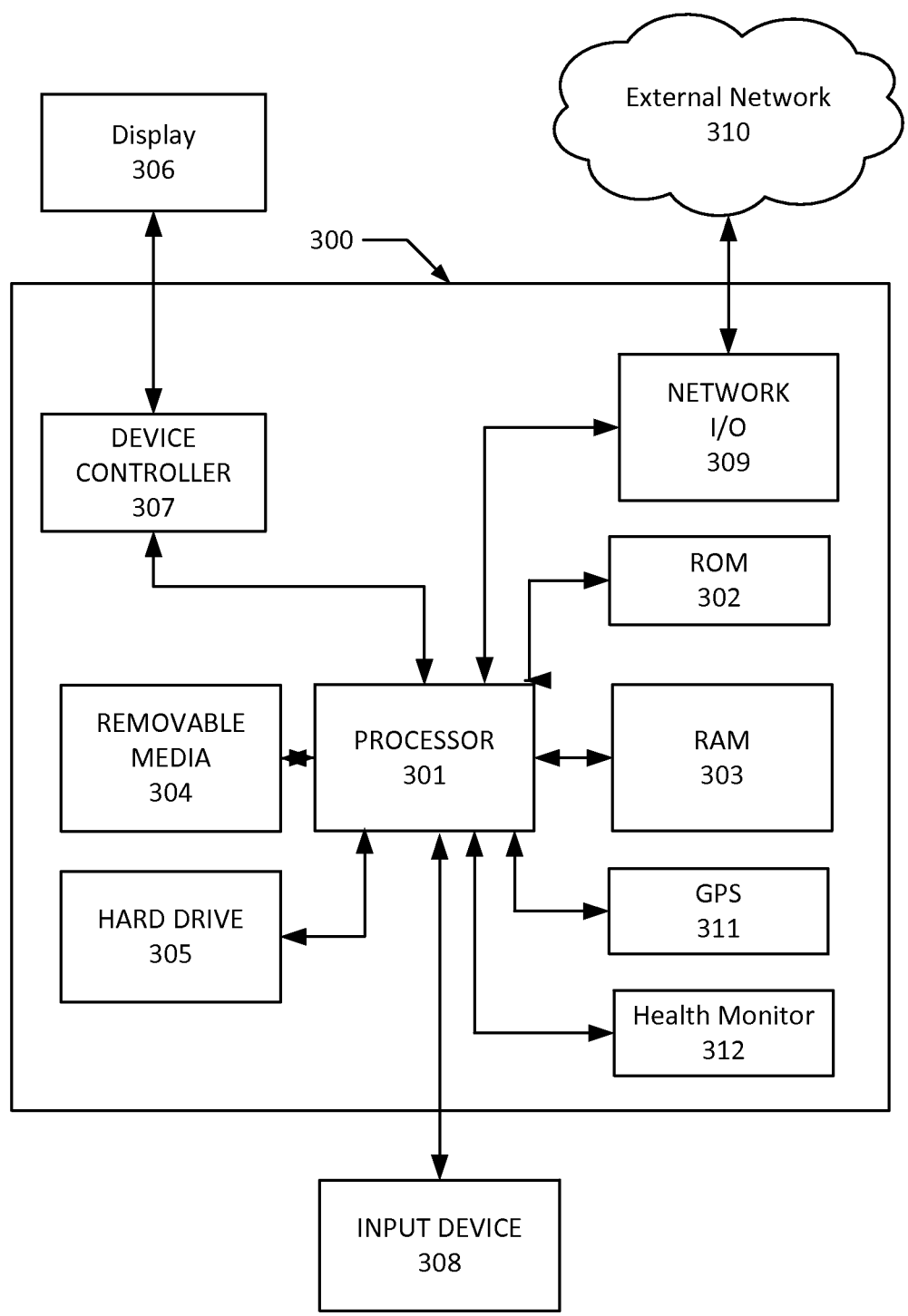
FIG. 3 illustrates an example computing device that can be used to implement any of the methods, servers, entities, and elements discussed herein and shown in the figures, in accordance with one or more aspects as described herein.

As will be described in greater detail below, there are situations where a transaction may involve both types of traffic, e.g., both Title VI traffic and external network (e.g., Internet) traffic. For instance, if a user is viewing an interface that indicates which content is available through the Title VI service (e.g., such that the selected content would be provided through the data processing facility 201), generation of the interface may involve collecting information from the external server 205. For example, the user interface may present thumbnail images of each item of selectable content, where the thumbnails are sourced from the Internet (e.g., from the external server 205) and downloaded via the external network 109 and the external network router 204. As mentioned previously, the service provider may choose to monitor certain types of data usage, such as non-Title VI Internet traffic utilized by a user. In such situations, however, it may be desirable that the data being transferred to and/or from the external server 205 for generating the Title VI user interface not be considered monitored data. There may be other situations, as well, where it is desired that data to and/or from the Internet, which would otherwise be considered eligible for monitoring, would not be monitored. As will be described, such selective monitoring may be controlled through the strategic use and mirroring of packet markings, such as but not limited to differentiated services code point (DSCP) and/or type of service (TOS) markings FIG. 3 illustrates general hardware and software elements of an example computing device 300 that may be used to implement any of the various elements discussed herein and shown in the figures. The computing device 300 may include, for instance, one or more processors 301, which may execute computer-readable instructions of a computer program to perform, or otherwise cause to occur, some or all of the features described herein. The instructions may be stored in any one or more types of computer-readable media to configure the operation of the processor 301. For example, the instructions may be stored in one or more memory chips (e.g., a read-only memory (ROM) 302 and/or a random access memory (RAM) 303), a hard disk drive, removable storage media 304 (such as a Universal Serial Bus (USB) drive, FLASH drive, compact disk (CD) or digital versatile disk (DVD), or floppy disk drive), and/or any other desired storage medium. Instructions may also be stored in an attached (or internal) hard drive 305. The computing device 300 may include one or more output devices, such as a display 306 (e.g., an external television) or multiple displays, and may include one or more output device controllers 307, such as a video processor. The computing device 300 may also include or be coupled with one or more user input devices 308, such as a remote control, keyboard, mouse, touch screen, microphone, video camera, etc. The computing device 300 may also include one or more network interfaces, such as a network input/output (I/O) circuit 309 (e.g., a network card) to communicate with an external network 310. The network input/output circuit 209 may be a wired interface, wireless interface, or a combination of the two. In some embodiments, the network input/output circuit 309 may include a modem (e.g., a cable modem), and the external network 310 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 311, which can be configured to receive and process global positioning signals and determine, with possible assistance from an external server and antenna, a geographic position of the device.

Modifications may be made to add, remove, combine, divide, etc. components of the computing device 300 as desired. Additionally, the components illustrated may be implemented using basic computing devices and components, and the same components (e.g., processor 301, ROM storage 302, display 306, etc.) may be used to implement any of the other computing devices and components described herein. For example, the various components herein may be implemented using computing devices having components such as a processor executing computer-executable instructions stored on a computer-readable medium, as illustrated in FIG. 3. Some or all of the entities described herein may be software based, and may co-exist in a common physical platform (e.g., a requesting entity can be a separate software process and program from a dependent entity, both of which may be executed as software on a common computing device).

One or more aspects of the present disclosure may be embodied in the form of, or otherwise utilize, computer-usable data and/or as computer-executable instructions, such as in one or more program modules, executed by one or more computing devices. Generally, program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

As discussed above, a device may, for a given transaction, mark sent packets using markings that mirror markings of received packets. A transaction may include any logical and/or time-wise grouping of communications, such as but not limited to a particular service flow and/or session. The markings may be contained in any portion of the packets, such as packet headers and/or packet payloads. By way of example only, the markings may include a quality of service marking, a DSCP marking, a TOS marking, a priority marking, etc. The markings may be distinct from source addresses, destination addresses, packet identifiers, time stamps, and/or other such information that may be identified by the packets. However, it is also possible that the markings may overlap with and/or include one or more such items of information.

Figure 4:
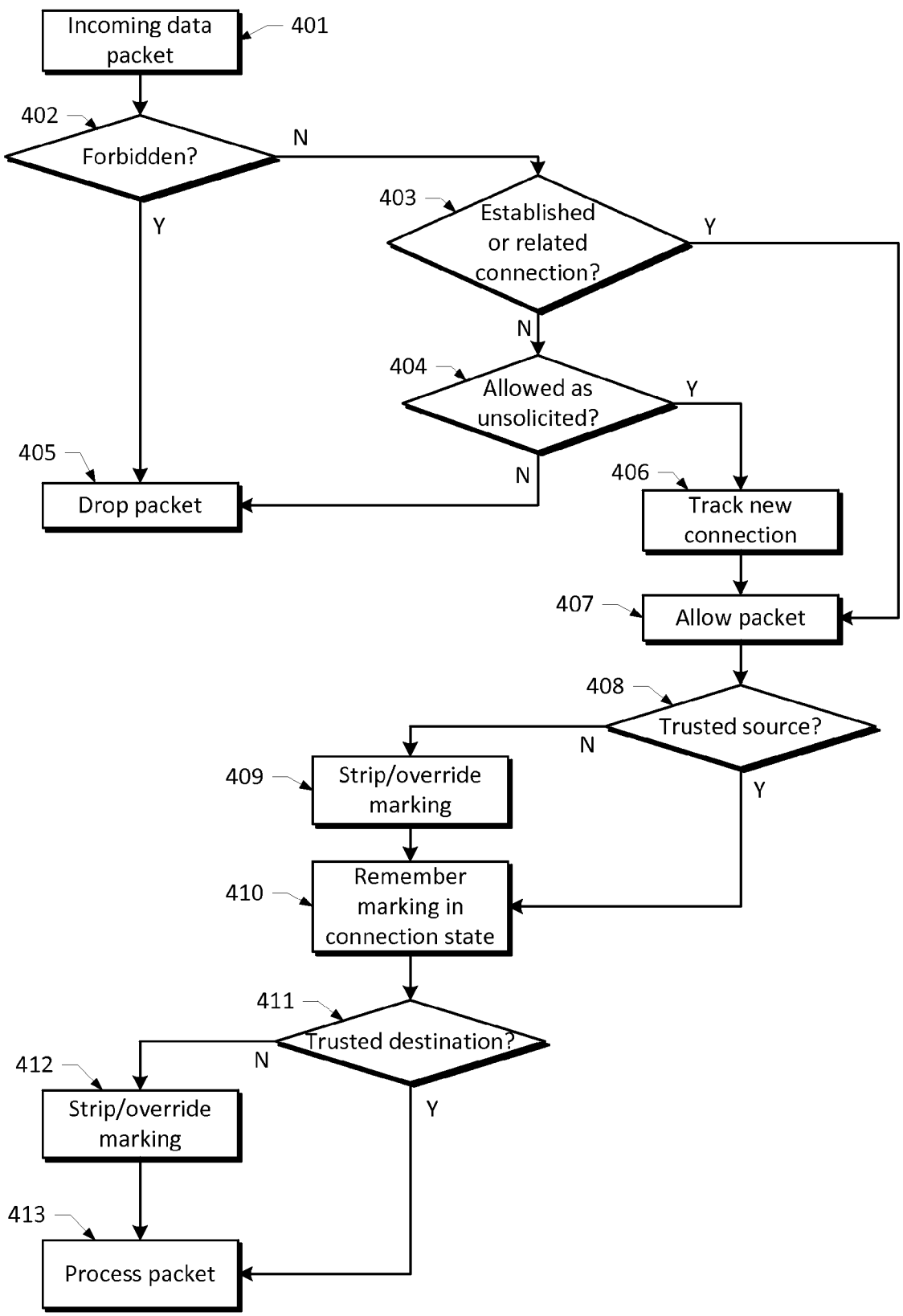
FIG. 4 is a flow chart illustrating an example method that may be performed in accordance with one or more aspects as described herein.

FIG. 4 is a flow chart illustrating an example method that may be performed in accordance with one or more aspects as described herein. The example method may be used, for example, upon receiving incoming packets by a device as part of that device's implementation of mirroring markings. As will be later discussed with reference to FIG. 5, that device may selectively use, in outgoing packets from the device, those markings identified by the previous incoming packets. In some embodiments, a single device may perform all of the steps of FIGS. 4 and/or 5. In describing FIGS. 4 and 5, it will be assumed by way of example, that a single device, such as a user end device and/or a service provider device, is performing each of the steps. However, in other embodiments, the steps in FIGS. 4 and/or 5 may be variously performed by two or more different devices.

At step 401 of FIG. 4, the device may receive an incoming data packet from an upstream direction or from a downstream direction. At step 402, the device may determine whether the packet is forbidden (e.g., blacklisted, marked for refusal, etc.). This may involve, for instance, the device determining whether the source address identified by the packet is a forbidden source address, the destination address identified by the packet is a forbidden destination address, the packet is received on a forbidden port, and/or based on any other properties of the packet. If the packet is forbidden, then the packet may be dropped at step 405. If the packet is not forbidden, then the process may move to step 403, at which the device may determine whether the packet is part of an established connection or related to an established connection, such as a transmission control protocol (TCP) socket connection that is in an ESTABLISHED state or a RELATED state. If it is determined that the packet is part of an established connection or related to an established connection, then the process may move to step 407, at which point the packet may be considered to be allowed for further processing by the device.

If it is determined that the packet is not part of an established connection and not related to an established connection (e.g., if the packet is part of a new connection), then the process may move to step 404, in which the device determines whether to allow the packet as an unsolicited packet (e.g., a packet that is part of a new connection). If the device determines that the packet should not be allowed, then the process may move to step 405, in which the packet may be dropped or otherwise ignored. If the device determines that the packet should be allowed, then the process may move to step 406, at which point the device may track the new connection such as by storing an identifier of the new connection. The process may then proceed to step 407, at which point the packet may be considered to be allowed for further processing by the device.

From step 407, the process may proceed to step 408, at which point the device may use the packet to determine whether the packet is from a trusted source or other predetermined source. This may involve, for instance, examining the source address identified in the header of the packet and comparing the source address with a table of trusted (or other predetermined) source addresses. To implement this, the device may be preconfigured with the table, which may be locally stored by the device and/or stored in a location available to the device. A trusted source may be any source, such as but not limited to one or more source addresses (e.g., a range of addresses) associated with the data processing facility 201 and/or other source under the control of the service provider. If it is determined that the source address is from a trusted source or other predetermined source, then at step 410 the device may remember (e.g., store) the marking of the packet, such as by associating the marking in a table with the connection state of the packet. If, at step 408, it is determined that the packet is not from a trusted source or other predetermined source, then the process may instead move first to step 409, at which point the device may strip or override the marking of the packet. This may involve, for instance, replacing the marking of the packet with a null value, a meaningless value, and/or some other override (e.g., a fixed default) value. It may be appropriate to strip or override the marking when the packet is from an untrusted device, because it may be desired that the device not mirror markings from untrusted devices. In other embodiments, where it is desirable for the device to pass the marking on to another downstream device, the marking may be left alone and the device may determine not to remember the marking so that such a marking from an untrusted device is not later mirrored.

At step 411, after stripping/overriding and/or remembering the marking at step 409 and/or step 410, the device may determine whether the packet is addressed to a trusted destination or other predetermined destination. This may involve, for instance, examining the destination address identified in the header of the packet and comparing the destination address with a table of trusted (or other predetermined) destination addresses. To implement this, the device may be preconfigured with the table, which may be locally stored by the device and/or stored in a location available to the device. A trusted destination may be any destination, such as but not limited to one or more destination addresses (e.g., a range of addresses) associated with the device itself and/or another device coupled downstream from the device. For instance, where the device implementing the method of FIG. 4 is the interface 120, then the packet may be addressed to a downstream device such as personal computer 114. If it is determined that the destination address is to a trusted destination or other predetermined destination, then at step 413 the device may continue to process the packet normally, such as by processing the packet at the device itself (where the packet is addressed to the device) and/or passing the packet downstream toward another device to which the packet is addressed.

If, at step 411, it is determined that the packet is not addressed to a trusted destination or other predetermined destination, then the process may instead move first to step 412, at which point the device may strip or override the marking of the packet. The stripping/overriding of step 412 may or may not be different from the stripping/overriding of step 409. For instance, the packet marking may be overridden at step 409 to a first value and/or overridden at step 412 to a different second value. In at least some cases, the value of the packet marking as established at step 409 may be an input to how the packet marking is overridden at step 412. Step 412 may involve, for instance, replacing the marking of the packet with a null value, a meaningless value, and/or some other override (e.g., a fixed default) value. It may be appropriate to strip or override the marking when the packet is directed to an untrusted destination, because it may be desired that the destination device not have access to the markings In other words, it may be desired that the markings be shared only amongst trusted devices. Otherwise, there may be a concern that untrusted devices could attempt to gain inappropriate access by mirroring received markings.

Figure 5:
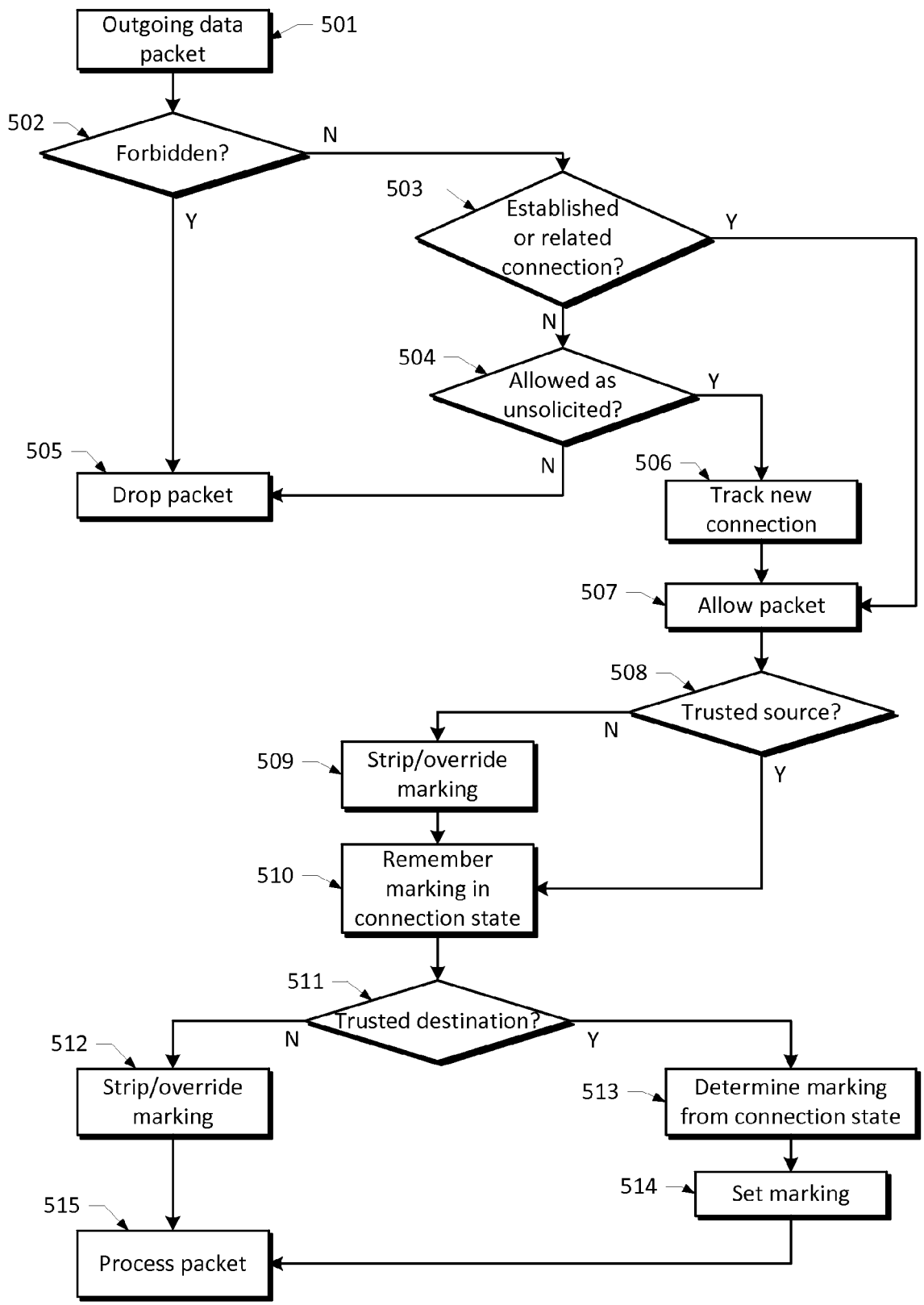
FIG. 5 is a flow chart illustrating another example method that may be performed in accordance with one or more aspects as described herein.

Referring to FIG. 5, the same device or a different device may also send an outgoing data packet upstream or downstream, such as shown in step 501. Because the packet may be sent by software and/or hardware not under the control of the service provider, it may be desirable to filter outgoing packets that should not be sent, and so at step 502, the device may determine whether the outgoing packet is forbidden (e.g., blacklisted). This may involve, for instance, the device determining whether the source address identified by the packet is a forbidden source address, the destination address identified by the packet is a forbidden destination address, the packet is to be sent on a forbidden port, and/or based on any other properties of the packet. If the packet is forbidden, then the packet may be dropped at step 505. If the packet is not forbidden, then the process may move to step 503, at which the device may determine whether the packet to be sent is part of an established connection or related to an established connection. If it is determined that the packet is part of an established connection or related to an established connection, then the process may move to step 507, at which point the packet may be considered to be allowed for further processing by the device.

If it is determined that the packet is not part of an established connection and not related to an established connection (e.g., if the packet is part of a new connection), then the process may move to step 506, at which point the device may track the new connection such as by storing an identifier of the new connection. The process may then proceed to step 507, at which point the packet may be considered to be allowed for further processing by the device.

From step 507, the process may proceed to step 508, at which point the device may use the packet to determine whether the packet is from a trusted source or other predetermined source. In a similar manner as discussed above with reference to FIG. 4, this may involve, for instance, examining the source address identified in the header of the packet and comparing the source address with a table of trusted (or other predetermined) source addresses. To implement this, the device may be preconfigured with the table, which may be locally stored by the device and/or stored in a location available to the device. A trusted source may be any source, such as but not limited to one or more source addresses (e.g., a range of addresses) associated with the device itself and/or another device coupled to the device. If it is determined that the source address is from a trusted source or other predetermined source, then at step 510 the device may remember the marking of the packet, such as by associating the marking in a table with the connection of the packet. If, at step 508, it is determined that the packet is not from a trusted source or other predetermined source, then the process may instead move first to step 509, at which point the device may strip or override the marking of the packet. This may involve, for instance, replacing the marking of the packet with a null value, a meaningless value, and/or some other override (e.g., a fixed default) value. It may be appropriate to strip or override the marking when the packet is from an untrusted device, because it may be desired that the untrusted device not attempt to mirror markings, and because the markings from an untrusted device may be incorrect or cause processing errors by the service provider. This is because the untrusted device may not have knowledge of the marking protocol described herein.

At step 511, after stripping/overriding and/or remembering the marking at step 509 and/or step 510, the device may determine whether the packet is addressed to a trusted destination or other predetermined destination. Similar to that described with reference to FIG. 4, this may involve, for instance, examining the destination address identified in the header of the packet and comparing the destination address with a table of trusted (or other predetermined) destination addresses. To implement this, the device may be preconfigured with the table, which may be locally stored by the device and/or stored in a location available to the device. A trusted destination may be any destination, such as but not limited to one or more destination addresses (e.g., a range of addresses) associated with the device itself and/or another device coupled downstream from the device. For instance, where the device implementing the method of FIG. 5 is the interface 120, then the packet may be addressed to an address associated with the data processing facility 201 or the external server 205. If it is determined that the destination address is to a trusted destination or other predetermined destination, then the device may determine the marking that was previously used in an incoming packet for the connection state associated with the outgoing packet. This may involve, for instance, consulting the above-discussed table associating markings with connections to determine the associated marking for the connection of the outgoing packet. At step 514, the device may change or otherwise set the marking of the packet to the determined marking that is associated with the connection. Next, at step 515, the device may continue to process the marked packet normally, such as by passing the marked packet upstream toward the destination address (e.g., passing the packet to the TS 104).

If, at step 511, it is determined that the packet is not addressed to a trusted destination or other predetermined destination, then the process may instead move to step 512, at which point the device may strip or override the marking of the packet. This may involve, for instance, replacing the marking of the packet with a null value, a meaningless value, and/or some other override (e.g., a fixed default) value. It may be appropriate to strip or override the marking when the packet is directed to an untrusted destination, because it may be desired that the destination device not have access to the markings In other words, it may be desired that the markings be shared only amongst trusted devices. Otherwise, there may be a concern that untrusted devices could attempt to gain inappropriate access by mirroring received markings. Moreover, untrusted devices may misinterpret and/or otherwise be confused by the markings. The process may then move to step 515, discussed above.

Thus, the above-described methods of FIGS. 4 and 5 are examples of how DSCP mirroring (or mirroring of other types of packet markings) may be implemented. When a packet in a connection is being passed to a trusted device, the packet may be marked with the marking associated with the connection (if not already so marked). This is referred to as mirroring, since the marking associated with the connection may have been previously discovered by an earlier packet in the connection that was provided by a trusted device, and so later packets in the connections have markings that mirror the earlier marking in the connection. When a packet in the connection is received from or forwarded to an untrusted device, the marking may be replaced and/or removed. Mirroring of packet markings may be implemented using, for example, the iptables rules shown below in Table 1. In the table below, various DSCP values are represented generically by WWWW, XXXX, YYYY, and ZZZZ. Any values may be used where these generic placeholders are shown.

TABLE 1

```
echo "${SCRIPTNAME}: Adding iptables rules.."
    iptables -A INPUT -p tcp ! -s 192.168.100.1 --dport 111 -j DROP
    iptables -A INPUT -p tcp -s 127.0.0.1 --dport 111 -j ACCEPT
    iptables -A INPUT -p udp ! -s 192.168.100.1 --dport 514 -j DROP
    iptables -A INPUT -p udp -s 127.0.0.1 --dport 514 -j ACCEPT
    #### SECURITY on eSTB side: DEFAULT RULES BEGIN ####
    iptables -A INPUT -i wan -s 192.168.100.0/24 -j ACCEPT #accept all internal traffic
    iptables -A INPUT -i wan -m dscp --dscp-class XXXX -j ACCEPT #accept all XXXX
    iptables -A INPUT -i wan -m dscp --dscp-class YYYY -j ACCEPT #accept all YYYY
    iptables -A INPUT -i wan -m dscp --dscp-class ZZZZ -j ACCEPT #accept all ZZZZ
    iptables -A INPUT -i lo -j ACCEPT #accept traffic for localhost (whitebox)
    iptables -A INPUT -i eth1 -j ACCEPT #traffic from MoCa targetting local apps
    iptables -A INPUT -j DROP #drop all other traffic on all interfaces
    #### SECURITY on eSTB side: DEFAULT RULES END ####
    #### SECURITY on WAN: ADDITIONAL RULES BEGIN ####
    #accept established/related traffic: includes BOOTP/DHCP, DNS etc (on all interfaces)
    iptables -I INPUT -m state --state ESTABLISHED,RELATED -j ACCEPT
    #### SECURITY on WAN: ADDITIONAL RULES END ####
    ##### DSCP MARKING RULES BEGIN #####
    #DSCP strip all marks on routed traffic (both directions) all protocols
    iptables -t mangle -A FORWARD -j DSCP --set-dscp WWWW
    #DSCP stripping all applications set marks [tcp, udp already marked ]
    iptables -t mangle -A POSTROUTING -o wan -p tcp ! -d192.168.100.0/24 -j DSCP --set-dscp WWWW
    #DSCP TCP syn marking (local)
    iptables -t mangle -A POSTROUTING -o wan -p tcp --syn ! -d192.168.100.0/24 -j DSCP --set-dscp-class WWWW
    #DSCP UDP marking
    iptables -t mangle -A POSTROUTING -o wan -p udp -j DSCP --set-dscp-class XXXX
    #DSCP mark mirroring (tcp, local)
    iptables -t mangle -I PREROUTING -i wan -m dscp --dscp-class XXXX -p tcp         -j CONNMARK --set-mark 0xA
    iptables -t mangle -I PREROUTING -i wan -m dscp --dscp-class cs1 -p tcp         -j CONNMARK --set-mark 0xB
    iptables -t mangle -I PREROUTING -i wan -m dscp --dscp-class cs5 -p tcp         -j CONNMARK --set-mark 0xC
    iptables -t mangle -A POSTROUTING -o wan -m connmark --mark 0xA -p tcp         -j DSCP --set-dscp-class XXXX
```

TABLE 1-continued

```
  iptables -t mangle -A POSTROUTING -o wan -m connmark --mark 0xB -p tcp       -j
DSCP --set-dscp-class YYYY
  iptables -t mangle -A POSTROUTING -o wan -m connmark --mark 0xC -p tcp       -j
DSCP --set-dscp-class ZZZZ
  #DSCP mark mirroring (udp, local) XXXX only
  iptables -t mangle -I PREROUTING -i wan -p udp -m state --state ESTABLISHED -m
dscp --dscp-class XXXX -j CONNMARK --set-mark 0xA
  iptables -t mangle -A POSTROUTING -o wan -p udp -m connmark --mark
0xA        -j DSCP --set-dscp-class XXXX
  ##### DSCP MARKING RULES END #####
```

Figure 6:
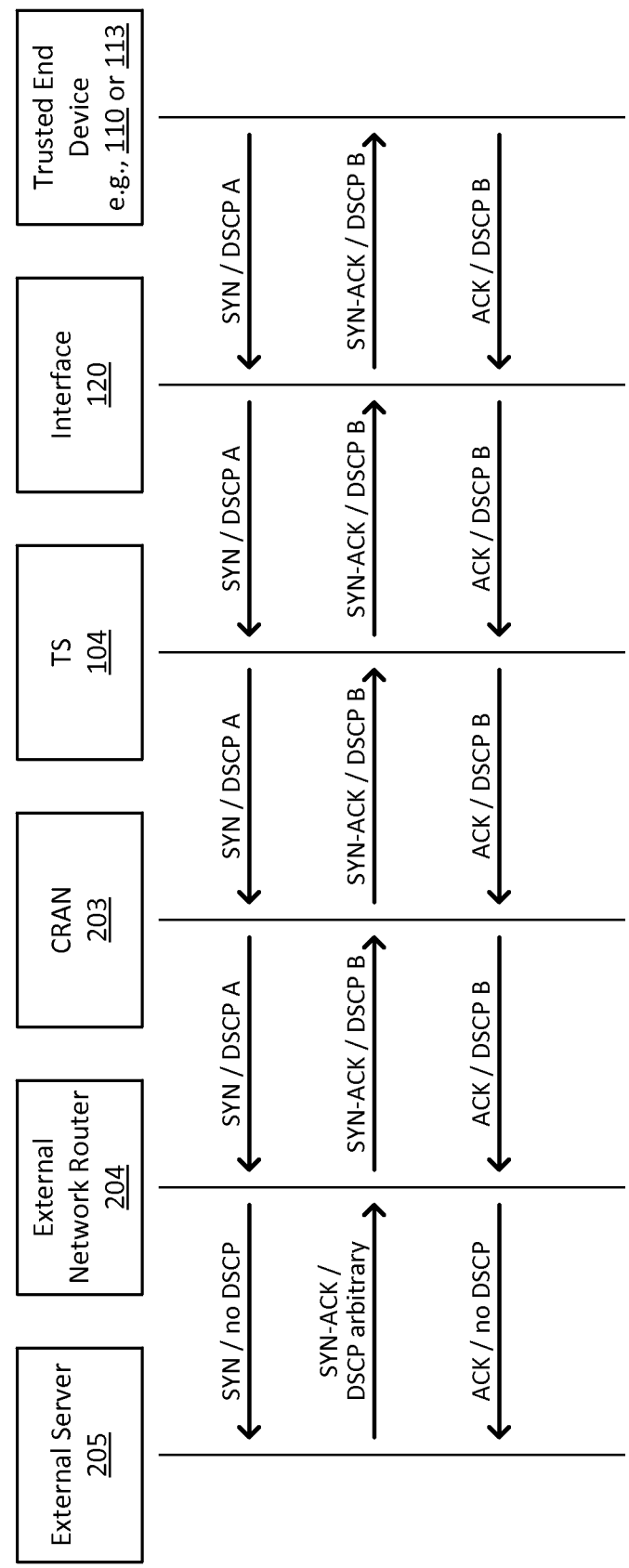
FIG. 6 is a signal flow diagram illustrating example signaling between a trusted end device and an external device in accordance with one or more aspects as described herein.

FIG. 6 is a signal flow diagram illustrating example signaling between a trusted end device and an external computing device (e.g., a server) in accordance with one or more aspects as described herein. The signaling shown in the flow chart may be the result of implementing, for example, the method(s) of FIGS. 4 and/or 5. In this particular example, the signals being sent are the transmission control protocol (TCP) handshaking packets of SYN, SYN-ACK, and ACK. However, the packets being transferred may be substitute with any other types of packets as desired. In FIG. 6 and the remaining signal flow diagrams (FIGS. 7-11), time flows downward. Thus, the signal flow diagrams are to be interpreted from top to bottom.

In the example of FIG. 6, a trusted end device, for example modem 110 or set top box/DVR 113, is attempting to communicate with an untrusted device such as external server 205. For instance, the trusted end device may be contacting external server 205 in order to obtain web page content. To begin the communication, the trusted end device may send a SYN packet upstream, addressed to external server 205. The trusted end device may or may not mark the SYN packet with a marking, such as a DSCP marking All references in the present document to a DSCP marking are merely illustrative and may be applied to any other types of packet marking. In this example, it will be assumed that the marking of the SYN packet is a DSCP marking, and the DSCP marking applied by the trusted end device will be generically referred to in this example as DSCP A, where A represents some value that may be arbitrary or may have meaning For purposes of this discussion, it does not matter what the value of A represents. Any suitable marking in addition or in the alternative to a DSCP marking may be used.

The interface 120, TS 105, CRAN 103, and external network router 204 may pass the SYN packet, possibly without modifying the DSCP A marking, to the ultimate destination (the external server 205). In other embodiments, the DSCP marking may be stripped and/or replaced before passing it outside of the trusted service provider network (such as at the external network router 204). In response to the SYN packet, the external server 205 may return a SYN-ACK packet addressed to the trusted end device, where the SYN-ACK packet may be marked with some arbitrary DSCP value (again, the value does not matter for purposes of this discussion). A device in the service provider's network, such as the external network router 204, may modify the DSCP value to better suit the service provider's network. In this example, the new value is referred to herein as DSCP B, with B being some value that may be arbitrary or have meaning The SYN-ACK packet, marked with DSCP B, may be passed downstream back to the trusted end device.

In response to the SYN-ACK packet, the trusted end device may perform, for example, the method of FIG. 4. For instance, and assuming that the SYN-ACK packet is not forbidden, the trusted end device may determine whether the SYN-ACK packet is part of an established or related connection (step 403). In this example, the SYN-ACK packet is not yet part of an established connection, and so the trusted end device may track the connection as a new connection (step 406), determine whether the source is trusted (step 408), and act accordingly. In this case, the source is trusted, and so the trusted end device may continue to step 410 by remembering the DSCP marking of the packet (DSCP B) and associating DSCP B with the particular connection and connection state on which the SYN-ACK packet was received.

The trusted end device may perform the remainder of the method of FIG. 4 and ultimately process the packet as appropriate. Next, the trusted end device may send an ACK packet upstream, addressed to the external server 205. In preparing the ACK packet, the trusted end device may perform, for example, the method of FIG. 5. For instance, the trusted end device may, at step 511, determine that the destination is trusted and, at steps 513 and 514, remember the marking associated with the connection (in this example, DSCP B), and mark the ACK packet with the associated marking (DSCP B). This is shown in FIG. 6, in which the DSCP B marked ACK packet is transferred upstream toward the TS 104. At some point before leaving the trusted service provider network, such as at the external network router 204, the DSCP marking may be stripped and/or modified before forwarding the ACK packet to the external server 205.

Figure 7:
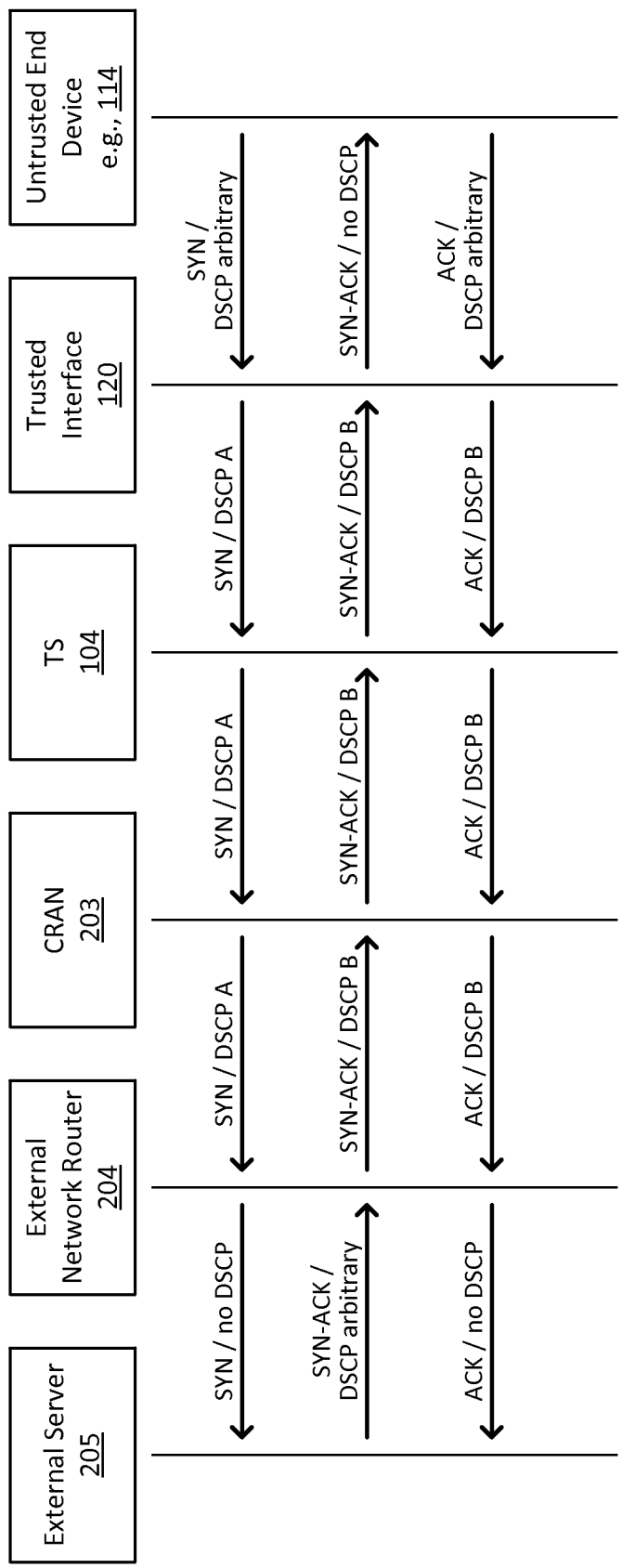
FIG. 7 is a signal flow diagram illustrating example signaling between an untrusted end device and an external device in accordance with one or more aspects as described herein.

FIG. 7 is another signal flow diagram illustrating example signaling, this time between an untrusted end device and an external device (e.g., server) in accordance with one or more aspects as described herein. The signaling shown in the flow chart may be the result of implementing, for example, the method(s) of FIGS. 4 and/or 5.

In the example of FIG. 7, an untrusted end device, for example personal computer 114, is attempting to communicate with an untrusted device such as external server 205. For instance, the untrusted end device may be contacting external server 205 in order to obtain web page content. To begin the communication, the untrusted end device may send a SYN packet upstream, addressed to external server 205. The untrusted end device may or may not mark the SYN packet with a marking, such as a DSCP marking In this example, the DSCP marking is arbitrary, as it will soon be replaced. In response to receiving the SYN packet, an upstream trusted device (e.g., the interface 120) may perform, for example, the method of FIG. 4. Thus, at step 409, the interface 120 may strip and/or override the DSCP marking and replace it with DSCP A, which might be a default value. In this example, step 410 may not be performed by the interface 120 to remember the DSCP marking value, because the marking is only a default value and is expected to be replaced with another DSCP marking value in the returned SYN-ACK packet.

The TS 105, CRAN 103, and external network router 204 may pass the SYN packet, possibly without modifying the DSCP A marking, to the ultimate destination (the external server 205). In other embodiments, the DSCP marking may be stripped and/or replaced before passing it outside of the trusted service provider network (such as at the external network router 204). In response to the SYN packet, the external server 205 may return a SYN-ACK packet addressed to the untrusted end device, where the SYN-ACK packet may be marked with some arbitrary DSCP value (again, the value does not matter for purposes of this discussion). A device in the service provider's network, such as the external network router 204, may modify the DSCP value to better suit the service provider's network. In this example, the new value is referred to herein as DSCP B, with B being some value that may be arbitrary or have meaning The SYN-ACK packet, marked with DSCP B, may be passed downstream back to the trusted end device. In the present example, there is no longer a need for default value DSCP A, because DSCP B is now associated with the connection and will be the mirrored DSCP value for the connection.

In response to the SYN-ACK packet, an intermediary trusted device (such as the interface 120) may perform, for example, the method of FIG. 4. For instance, and assuming that the SYN-ACK packet is not forbidden, the trusted device may determine whether the SYN-ACK packet is part of an established or related connection (step 403). In this example, the SYN-ACK packet is not yet part of an established connection, and so the trusted device may track the connection as a new connection (step 406), determine whether the source is trusted (step 408), and act accordingly. In this case, the source of the DSCP marking (marking DSCP B) is the external network router 204, which may be a trusted source, and so the trusted device may continue to step 410 by remembering the DSCP marking (DSCP B, in this example) for the connection.

The trusted device may perform the remainder of the method of FIG. 4 and ultimately process the packet as appropriate, passing the packet on to the untrusted end device. Because the trusted device may have determined, at step 411, that the untrusted end device is not a trusted destination, the trusted device may strip/override the DSCP marking at step 412 before processing/forwarding the packet to the untrusted end device at step 413. This is shown in FIG. 7, in which the SYN-ACK packet received by the untrusted end device has no DSCP (or, alternatively, a DSCP of some value other than B).

Next, the untrusted end device may send an ACK packet upstream, addressed to the external server 205. The ACK packet may have some DSCP value that is arbitrary for purposes of the present discussion. Upon receipt of the ACK packet by an upstream trusted device (e.g., the interface 120), the trusted device may perform the method of FIG. 4. This may result in the DSCP value associated with the connection being remembered and applied to the ACK message (e.g., steps 409 and 410). This is shown in FIG. 7, in which the DSCP B marked ACK packet is transferred upstream toward the destination (the external server 205). At some point before leaving the trusted service provider network, such as at the external network router 204, the DSCP marking may be stripped and/or modified before forwarding the ACK packet to the external server 205.

Figure 8:
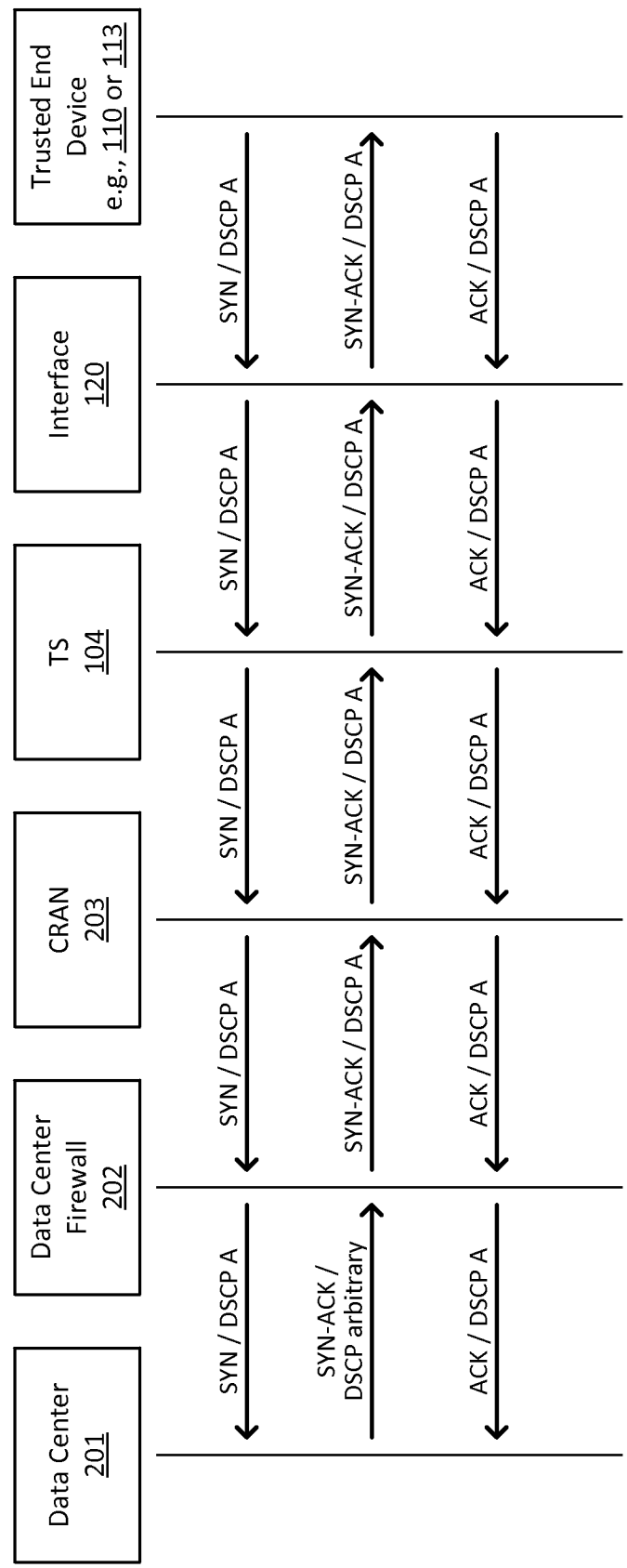
FIG. 8 is a signal flow diagram illustrating example signaling between a trusted end device and a data processing facility in accordance with one or more aspects as described herein.

FIG. 8 is another signal flow diagram illustrating example signaling, this time between a trusted end device and a trusted address such as the data processing facility 201 in accordance with one or more aspects as described herein. The signaling shown in the flow chart may be the result of implementing, for example, the method(s) of FIGS. 4 and/or 5.

In the example of FIG. 8, a trusted end device, for example modem 110 or set top box/DVR 113, is attempting to communicate with another trusted device such as a device of the data processing facility 201. For instance, the trusted end device may be contacting the data processing facility 201 in order to initiate Title VI streaming of video content. To begin the communication, the trusted end device may send a SYN packet upstream, addressed to an appropriate address of the data processing facility 201. The trusted end device may mark the SYN packet with a marking, such as DSCP A.

The interface 120, TS 105, CRAN 103, and the firewall 202 may pass the SYN packet, possibly without modifying the DSCP A marking, to the ultimate destination (the data processing facility 201). In response to the SYN packet, the data processing facility 201 may return a SYN-ACK packet addressed to the trusted end device, where the SYN-ACK packet may be marked with some arbitrary DSCP value. A device in the service provider's network, such as the firewall 202, may modify the DSCP value to better suit the service provider's network and/or to mirror the DSCP value of the previously-received SYN packet. In doing so, the firewall 202 may implement, for instance, the method of FIG. 4. Thus, the SYN-ACK packet may be modified to be marked with DSCP A (the value of the DSCP of the upstream SYN packet). The SYN-ACK packet, marked with DSCP A, may be passed downstream back to the trusted end device. In further embodiments, the firewall 202 may not implement DSCP marking mirroring at all (e.g., may not implement the processes of FIGS. 4 and/or 5), and may instead set/override the DSCP value of outgoing downstream packets to a desired value regardless of the DSCP value of received upstream packets.

In response to the SYN-ACK packet, the trusted end device may perform, for example, the method of FIG. 4. For instance, and assuming that the SYN-ACK packet is not forbidden, the trusted end device may determine whether the SYN-ACK packet is part of an established or related connection (step 403). In this example, the SYN-ACK packet is not yet part of an established connection, and so the trusted end device may track the connection as a new connection (step 406), determine whether the source is trusted (step 408), and act accordingly. In this case, the source of the DSCP marking is the firewall 202, which may be a trusted source, and so the trusted end device may continue to step 410 by remembering the DSCP marking (DSCP A, in this example) for the connection, if the DSCP marking has not already been remembered for the connection.

The trusted end device may perform the remainder of the method of FIG. 4 and ultimately process the packet as appropriate. Next, the trusted end device may send an ACK packet upstream, addressed to the data processing facility 201. In preparing the ACK packet, the trusted end device may perform, for example, the method of FIG. 5. For instance, the trusted end device may, at step 510, remember the marking associated with the connection (in this example, DSCP A), and thus mark the ACK packet with DSCP A. This is shown in FIG. 8, in which the DSCP A marked ACK packet is transferred upstream toward the destination (the data processing facility 201).

Figure 9:
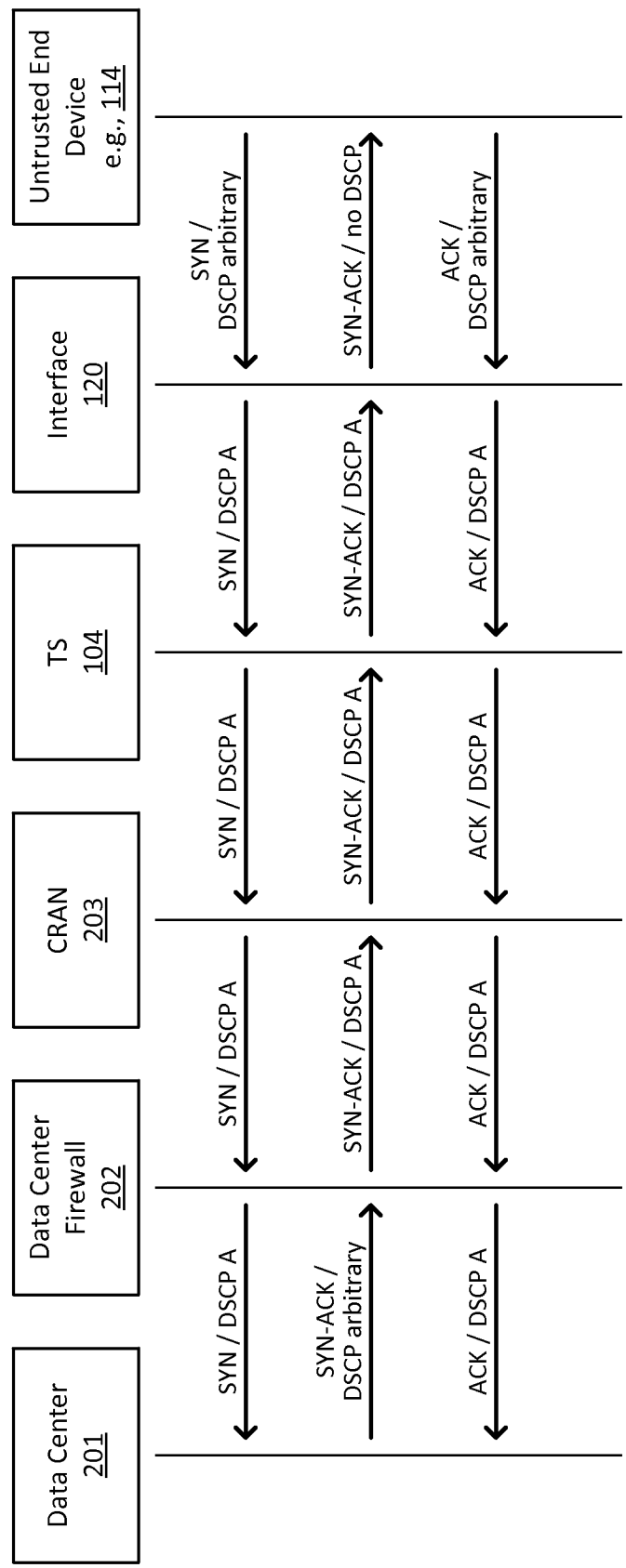
FIG. 9 is a signal flow diagram illustrating example signaling between an untrusted end device and a data processing facility in accordance with one or more aspects as described herein.

FIG. 9 is another signal flow diagram illustrating example signaling, this time between an untrusted end device and a trusted address such as the data processing facility 201 in accordance with one or more aspects as described herein. The signaling shown in the flow chart may be the result of implementing, for example, the method(s) of FIGS. 4 and/or 5.

In the example of FIG. 9, an untrusted end device, for example personal computer 114, is attempting to communicate with a trusted device such as a device of the data processing facility 201. For instance, the untrusted end device may be contacting the data processing facility 201 in order to initiate Title VI streaming of video content. To begin the communication, the untrusted end device may send a SYN packet upstream, addressed to the data processing facility 201. The untrusted end device may or may not mark the SYN packet with a marking, such as a DSCP marking. In this example, the DSCP marking is arbitrary, as it will soon be replaced. In response to receiving the SYN packet, an upstream trusted device (e.g., the interface 120) may perform, for example, the method of FIG. 4. Thus, at step 409, the interface 120 may strip and/or override the DSCP marking and replace it with DSCP A.

The TS 105, CRAN 103, and the firewall 202 may pass the SYN packet, possibly without modifying the DSCP A marking, to the ultimate destination (the data processing facility 201). In response to the SYN packet, the data processing facility 201 may return a SYN-ACK packet addressed to the untrusted end device, where the SYN-ACK packet may be marked with some arbitrary DSCP value. A device in the service provider's network, such as the firewall 202, may modify the DSCP value to better suit the service provider's network and/or to mirror the DSCP value of the previously received upstream SYN packet. In this example, the firewall 202 marks the SYN-ACK packet with (mirrors) the DSCP value of the previous upstream SYN packet. Thus, the SYN-ACK packet, marked with DSCP A, may be passed downstream back to the trusted end device.

In response to the SYN-ACK packet, an intermediary trusted device (such as the interface 120) may perform, for example, the method of FIG. 4. For instance, and assuming that the SYN-ACK packet is not forbidden, the trusted device may determine whether the SYN-ACK packet is part of an established or related connection (step 403). In this example, the SYN-ACK packet is not yet part of an established connection, and so the trusted device may track the connection as a new connection (step 406), determine whether the source is trusted (step 408), and act accordingly. In this case, the source of the DSCP marking (marking DSCP A) is the firewall 202, which may be a trusted source, and so the trusted device may continue to step 410 by remembering the DSCP marking (DSCP A, in this example) for the connection, if not already remembered for the connection.

The trusted device may perform the remainder of the method of FIG. 4 and ultimately process the packet as appropriate, passing the packet on to the untrusted end device. Because the trusted device may have determined, at step 411, that the untrusted end device is not a trusted destination, the trusted device may strip/override the DSCP marking at step 412 before processing/forwarding the packet to the untrusted end device at step 413. This is shown in FIG. 9, in which the SYN-ACK packet received by the untrusted end device has no DSCP (or, alternatively, a DSCP of some value other than A).

Next, the untrusted end device may send an ACK packet upstream, addressed to the data processing facility 201. The ACK packet may have some DSCP value that is arbitrary for purposes of the present discussion. Upon receipt of the ACK packet by an upstream trusted device (e.g., the interface 120), the trusted device may perform the method of FIG. 4. This may result in the DSCP value associated with the connection being remembered and applied to the ACK message (e.g., steps 409 and 410). This is shown in FIG. 9, in which the DSCP A marked ACK packet is transferred upstream toward the destination (the external server 205).

Figure 10:
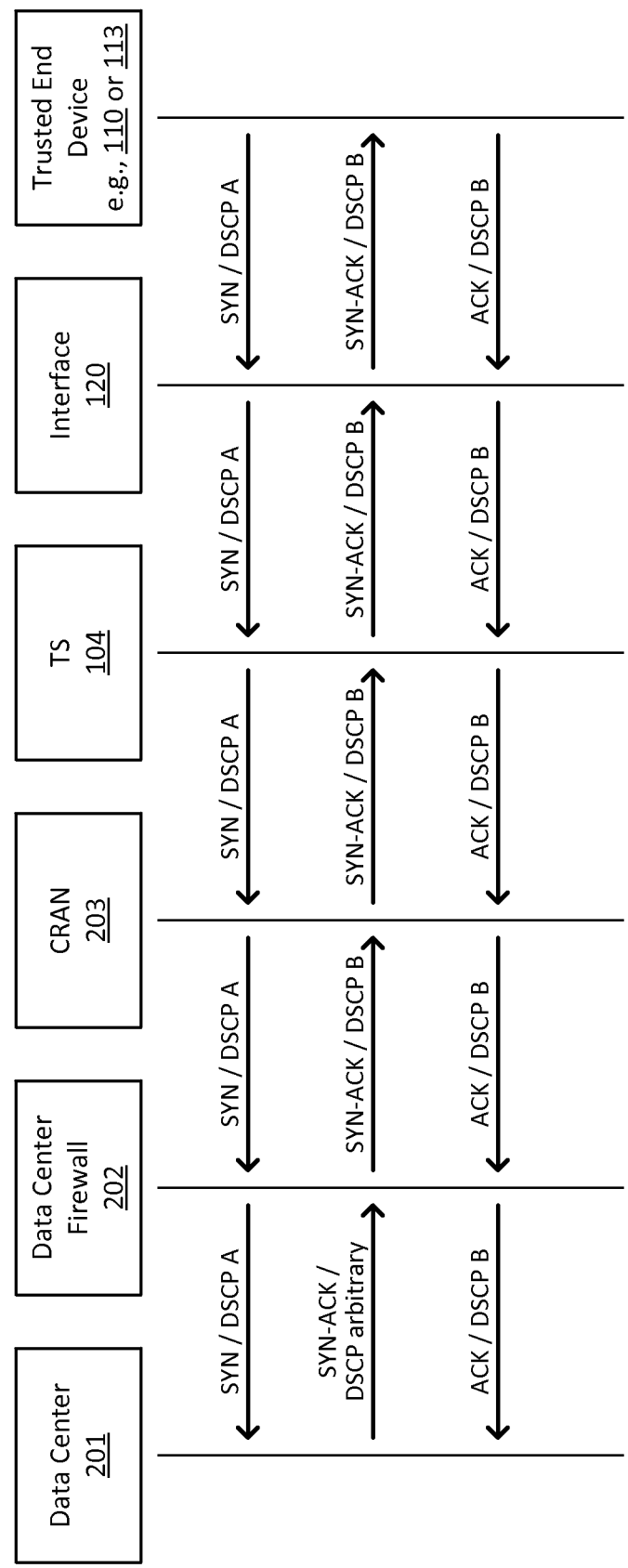
FIG. 10 is a signal flow diagram illustrating another example of signaling between a trusted end device and a data processing facility in accordance with one or more aspects as described herein.

FIG. 10 is another signal flow diagram illustrating example signaling, this time between a trusted end device and a trusted address such as the data processing facility 201 in accordance with one or more aspects as described herein. The signaling shown in the flow chart may be the result of implementing, for example, the method(s) of FIGS. 4 and/or 5. FIG. 10 is similar to FIG. 8, except the return SYN-ACK packet is marked with a DSCP (DSCP B) that is different from the marking of the upstream SYN packet. Because of this, the trusted end device in this example may use, for instance, the method of FIG. 5 to mirror the DSCP marking of the SYN-ACK packet in the responsive ACK packet (with DSCP B).

Figure 11:
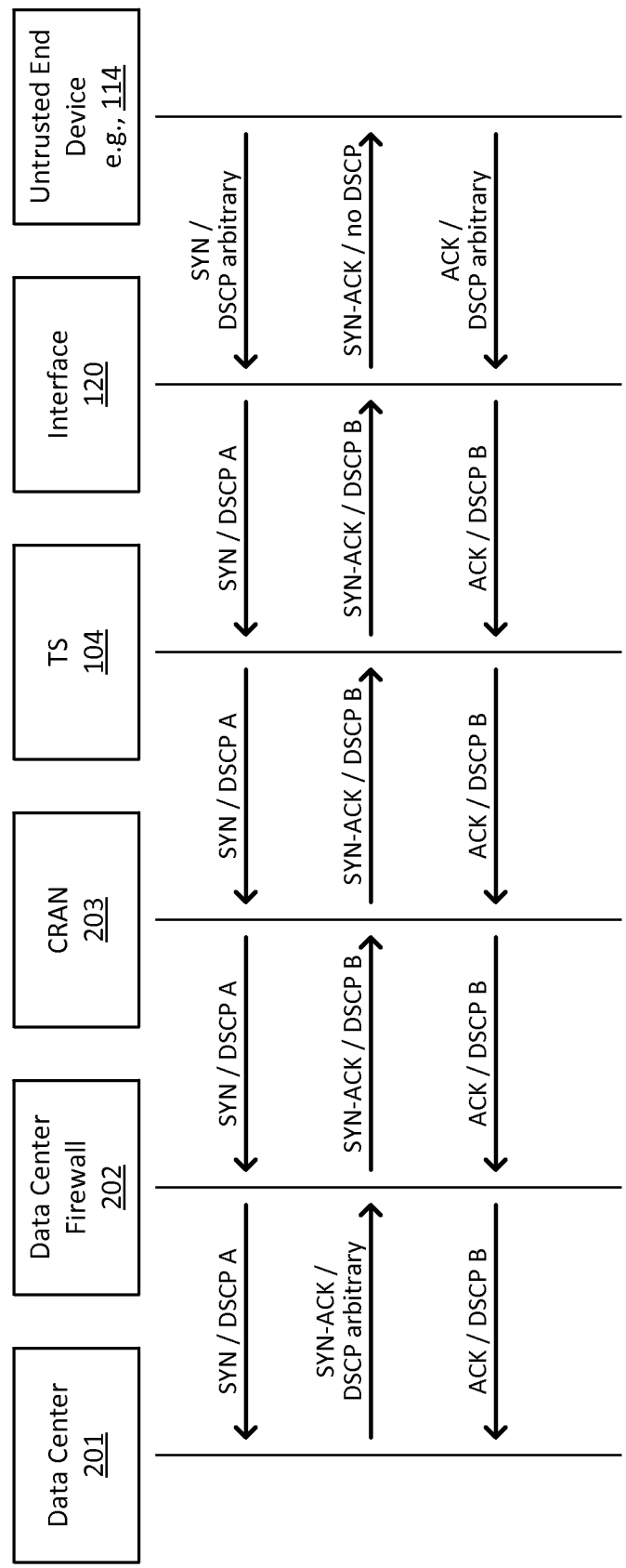
FIG. 11 is a signal flow diagram illustrating another example of signaling between an untrusted end device and a data processing facility in accordance with one or more aspects as described herein.

FIG. 11 is another signal flow diagram illustrating example signaling, this time between an untrusted end device and a trusted address such as the data processing facility 201 in accordance with one or more aspects as described herein. The signaling shown in the flow chart may be the result of implementing, for example, the method(s) of FIGS. 4 and/or 5. FIG. 11 is similar to FIG. 9, except the return SYN-ACK packet is marked with a DSCP (DSCP B) that is different from the marking of the upstream SYN packet. Because of this, the trusted device in this example may use, for instance, the method of FIG. 5 to mirror the DSCP marking of the SYN-ACK packet when forwarding the responsive ACK packet (with DSCP B) that was passed upstream from the untrusted end device.

As discussed previously, mirroring of packet markings may allow a service provider to exercise additional control over various features. For example, the service provider may be able to better distinguish between packets that are sent/received in the context of Title VI features and packets that are sent/received in the context of Internet browsing and/or in the context of other non-Title VI data features. As explained previously, it may be desirable to differentiate between such data usage for purposes of, for instance, data monitoring. Such differentiation may traditionally be difficult or even impossible in certain circumstances. For example, a Title VI or other designated-content feature may involve retrieving information from an Internet web site (or other external source) in order to fulfill the feature. As an example, a designated-content user interface providing a listing of designated video content selectable for viewing (e.g., on a Title VI basis) may obtain thumbnail images and/or other information about the video content from the Internet, for presenting to the user. An example of this is shown in FIG. 12, which illustrates a pair of example screen shots in accordance with one or more aspects as described herein.

Figure 12:
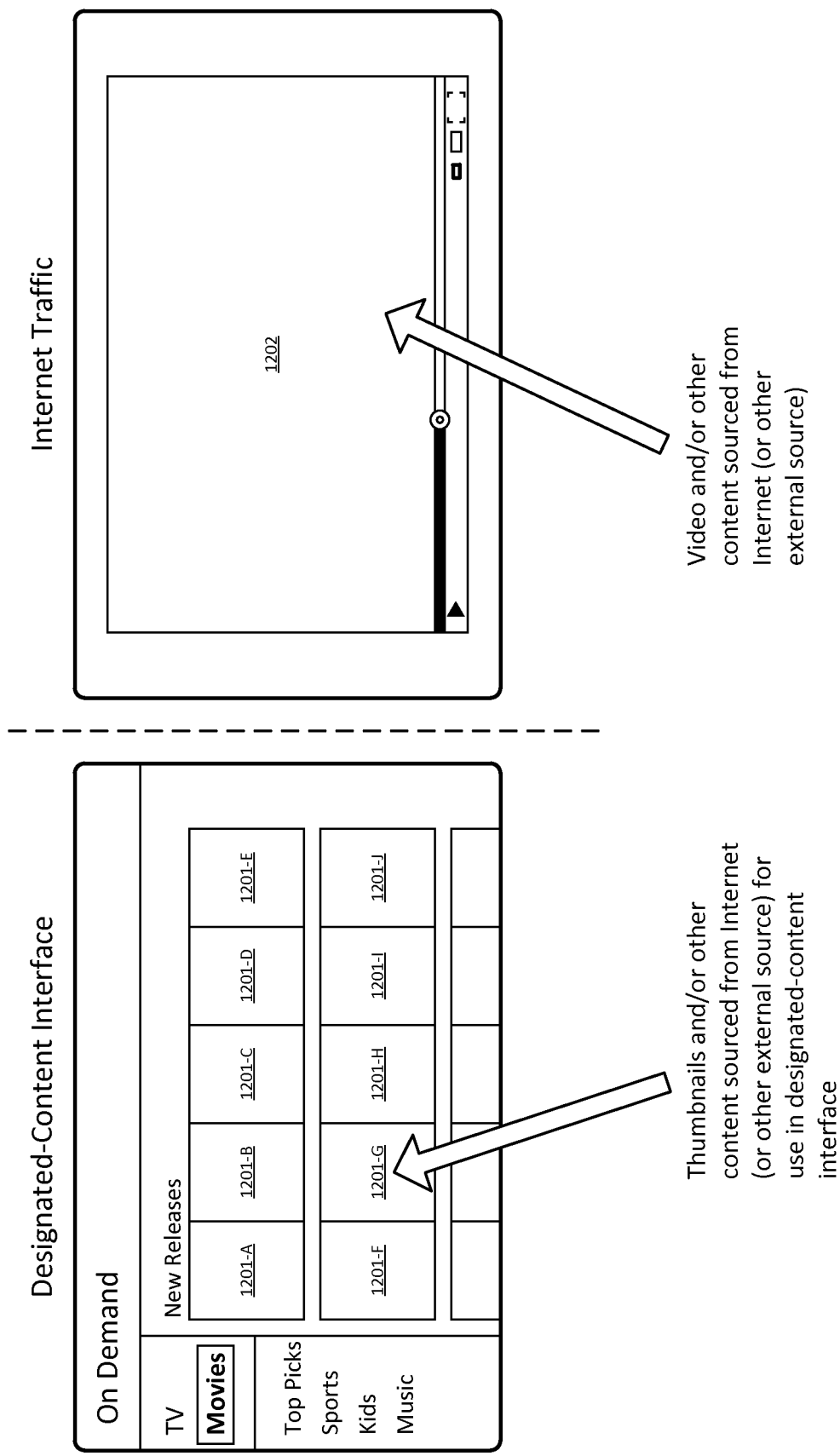
FIG. 12 is an illustration of a pair of example interfaces in accordance with one or more aspects as described herein.

The left-hand screen shot of FIG. 12 shows an example user interface that may be displayed to allow a user to select on-demand video content (or other types of designated content) to be presented to the user. The user interface may contain one or more thumbnail images 1201-A through 1201-J that may be obtained, not necessarily from the data processing facility 201, but rather from an Internet web site such as a web site hosted by the external server 205, or from another source external to the data processing facility 201 and/or external to other systems under the control of the service provider.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

The invention claimed is:

1. A method, comprising:
    receiving, by a computing device via a network, a first data packet having a first differentiated services code point (DSCP) marking;
    associating, by the computing device, the first DSCP marking with a first connection associated with the first data packet;
    receiving, by the computing device via the network, a second data packet directed to a destination;
    determining, by the computing device, whether to mark the second data packet with the first DSCP marking or with a second DSCP marking based on whether a connection associated with the second data packet is the first connection and on whether the destination is a trusted destination or a non-trusted destination;
    marking by the computing device and based on the determining, the second data packet; and
    sending, by the computing device toward the destination and based on the determining, the marked second data packet.

2. The method of claim 1, wherein prior to marking the second data packet, the second data packet is marked with a third DSCP marking, the method further comprising:
    responsive to the determining that the connection associated with the second data packet is the first connection, removing the third DSCP marking from the second data packet.

3. The method of claim 1, wherein the first connection comprises a transmission control protocol (TCP) socket connection.

4. The method of claim 1, wherein the first data packet comprises a transmission control protocol (TCP) SYN-ACK data packet.

5. The method of claim 4, wherein the second data packet comprises a TCP ACK data packet.

6. The method of claim 1, wherein the receiving the first data packet comprises receiving, by the computing device, the first data packet upstream via the network, and wherein the sending comprises sending, by the computing device, the second data packet downstream via the network.

7. The method of claim 1, wherein the receiving the first data packet comprises receiving, by the computing device, the first data packet downstream via the network, and wherein the sending comprises sending, by the computing device, the second data packet upstream via the network.

8. The method of claim 1, further comprising:
    storing, by the computing device, information associating each of a plurality of connections with a different DSCP marking of a plurality of DSCP markings, wherein the plurality of connections comprises the first connection and the plurality of DSCP markings comprises the first DSCP marking; and
    determining, based on the information, which of the plurality of DSCP markings is associated with the first connection,
    wherein the marking is performed further in response to determining that the first DSCP marking is associated with the first connection.

9. A method, comprising:
    receiving, by a computing device via a network, a first data packet;
    determining, by the computing device, based on a connection associated with the first data packet, based on a predetermined association between one or more differentiated services code point (DSCP) markings and one or more connections, and based on whether a destination of the first data packet is a trusted destination, whether to mark the first data packet with a first DSCP marking or with a second DSCP marking;
    marking, by the computing device and based on the determination, the first data packet; and
    sending, by the computing device, the marked first data packet.

10. The method of claim 9, wherein prior to the marking, the first data packet has a third DSCP marking, the method further comprising removing the third DSCP marking from the first data packet.

11. The method of claim 9, wherein the one or more connections comprise one or more transmission control protocol (TCP) socket connections.

12. The method of claim 9, further comprising establishing the predetermined association between the one or more DSCP markings and the one or more connections based on a DSCP marking of a second data packet and a connection associated with the second data packet, wherein the second data packet is received by the computing device prior to marking the first data packet.

13. The method of claim 12, wherein the second data packet is received by the computing device downstream via the network, and wherein the sending comprises sending, by the computing device, the first data packet upstream via the network.

14. The method of claim 9, further comprising storing, by the computing device, information associating each of the one or more connections with a different one of the one or more DSCP markings,
    wherein the determining whether to mark the first data packet with the first DSCP marking or with the second DSCP marking comprises determining the first DSCP marking or the second DSCP marking based on the information.

15. A method, comprising:
    receiving, by a computing device via a network, a first data packet marked with a first differentiated services code point (DSCP) marking;
    responsive to determining that a destination of the first data packet is a first untrusted destination, modifying the first DSCP marking prior to sending the first data packet toward the first untrusted destination;
    receiving, by the computing device via the network from the first untrusted destination, a second data packet; and
    determining, based on whether a destination associated with the second data packet is a second untrusted destination, whether to mark the second data packet with the first DSCP marking, a second DSCP marking, or the modified first DSCP marking.

16. The method of claim 15, wherein the modifying the first DSCP marking comprises removing the first DSCP marking from the first data packet.

17. The method of claim 15, wherein the first data packet is associated with a transmission control protocol (TCP) socket connection.

18. The method of claim 15, wherein the first data packet comprises a transmission control protocol (TCP) SYN-ACK data packet.

19. The method of claim 15, wherein the first data packet comprises a transmission control protocol (TCP) ACK data packet.

20. The method of claim 15, further comprising marking the second data packet with the modified first DSCP marking responsive to determining that the destination associated with the second data packet is the second untrusted destination.

\* \* \* \* \*

UNITED STATES PATENT AND TRADEMARK OFFICE
CERTIFICATE OF CORRECTION

PATENT NO. : 9,948,605 B2
APPLICATION NO. : 14/335479
DATED : April 17, 2018
INVENTOR(S) : Chen et al.

It is certified that error appears in the above-identified patent and that said Letters Patent is hereby corrected as shown below:

In the Specification

Column 2, Summary, Line 29:
After "marking" please insert --.--

Column 6, Detailed Description, Line 38:
After "markings" insert --.--

Column 6, Detailed Description, Line 67:
Delete "209" and insert --309--

Column 8, Detailed Description, Line 8:
After "markings" insert --.--

Column 9, Detailed Description, Line 62:
After "markings" insert --.--

Column 12, Detailed Description, Line 7:
After "markings" insert --.--

Column 13, Detailed Description, Line 35:
After "marking" insert --.--

Column 13, Detailed Description, Line 43:
After "meaning" insert --.--

Column 13, Detailed Description, Line 47:
Delete "105," and insert --104,--

Signed and Sealed this
Nineteenth Day of March, 2019

Andrei Iancu
*Director of the United States Patent and Trademark Office*

Column 13, Detailed Description, Line 47:
Delete "103," and insert --203,--

Column 13, Detailed Description, Line 63:
After "meaning" insert --.--

Column 14, Detailed Description, Line 58:
After "marking" insert --.--

Column 15, Detailed Description, Line 3:
Delete "105," and insert --104,--

Column 15, Detailed Description, Line 3:
Delete "103," and insert --203,--

Column 15, Detailed Description, Line 18:
After "meaning" insert --.--

Column 16, Detailed Description, Line 17:
Delete "105," and insert --104,--

Column 16, Detailed Description, Line 17:
Delete "103," and insert --203,--

Column 17, Detailed Description, Line 22:
Delete "105," and insert --104,--

Column 17, Detailed Description, Line 22:
Delete "103," and insert --203,--

In the Claims

Column 19, Claim 1, Line 31:
After "marking" insert --,--